(12) United States Patent
Williams

(10) Patent No.: US 10,580,063 B2
(45) Date of Patent: Mar. 3, 2020

(54) MESSAGING SYSTEM

(71) Applicant: First Data Corporation, Greenwood Village, CO (US)

(72) Inventor: Clarence Williams, Brooklyn, NY (US)

(73) Assignee: First Data Corporation, Greenwood Village, CO (US)

(*) Notice: Subject to any disclaimer, the term of this patent is extended or adjusted under 35 U.S.C. 154(b) by 658 days.

(21) Appl. No.: 14/836,477

(22) Filed: Aug. 26, 2015

(65) Prior Publication Data
US 2017/0061524 A1    Mar. 2, 2017

(51) Int. Cl.
| | | |
|---|---|---|
| *G06Q 30/00* | (2012.01) | |
| *G06Q 30/06* | (2012.01) | |
| *H04W 4/14* | (2009.01) | |
| *H04L 12/58* | (2006.01) | |

(52) U.S. Cl.
CPC ......... *G06Q 30/0637* (2013.01); *G06Q 30/06* (2013.01); *G06Q 30/0601* (2013.01); *G06Q 30/0613* (2013.01); *G06Q 30/0633* (2013.01); *G06Q 30/0641* (2013.01); *H04L 51/04* (2013.01); *H04W 4/14* (2013.01)

(58) Field of Classification Search
CPC ................. G06Q 30/0601–0645; G06Q 30/08
USPC ............................................... 705/26.1–27.2
See application file for complete search history.

(56) References Cited

U.S. PATENT DOCUMENTS

| | | | | |
|---|---|---|---|---|
| 2002/0013734 A1* | 1/2002 | Bueno | ..................... | G06Q 30/06 705/15 |
| 2002/0049644 A1* | 4/2002 | Kargman | ............... | G06Q 20/20 705/26.1 |
| 2003/0109248 A1* | 6/2003 | Lewis | ..................... | H04L 29/06 455/412.1 |
| 2006/0006226 A1* | 1/2006 | Fitzgerald | .............. | G06Q 20/10 235/380 |
| 2007/0106568 A1* | 5/2007 | Asher | ..................... | G06Q 30/02 705/26.81 |
| 2008/0040233 A1* | 2/2008 | Wildman | ............... | G06Q 30/06 705/26.81 |

(Continued)

OTHER PUBLICATIONS

Ali, Sarmad, "Text Messaging Speeds Up Fast-Food Orders", Sep. 20, 2006, Wall Street Journal, accessed at [https://www.wsj.com/articles/SB115870978859668270] (Year: 2006).*

*Primary Examiner* — Jeffrey A. Smith
*Assistant Examiner* — Lindsey B Smith
(74) *Attorney, Agent, or Firm* — Kilpatrick Townsend & Stockton LLP

(57) ABSTRACT

A method for facilitating mobile ordering includes associating a merchant handle with a merchant. A user account including a handle is created for a user within an ordering system. A product order, having order details, is received. The product order is stored and is associated with an order code such that the order details are retrievable based on reception of the order code. An enrollment message is provided to the handle. A message including the order code is received from the handle directed to the merchant handle. The handle is associated with the merchant handle and the order code to identify the product order, the merchant, and the user. An order confirmation message is including order details is provided to the handle. A user confirmation message is received from the handle. The product order is communicated to the merchant and an order status message to the handle.

9 Claims, 5 Drawing Sheets

(56) References Cited

U.S. PATENT DOCUMENTS

2008/0103918 A1\* 5/2008 Burnette ............... G06Q 30/06
705/15

\* cited by examiner

MESSAGING SYSTEM

BACKGROUND OF THE INVENTION

The use of portable electronic devices such as smart cellular telephones as payment and ordering devices is increasing in popularity. Oftentimes smaller businesses may struggle to provide mobile ordering systems, as the cost for equipment, websites, and/or other mobile ordering infrastructure may be too high. Thus, inexpensive, simple solutions are necessary. Additionally, as the demand for mobile ordering options increases, faster, more efficient order solutions are needed.

BRIEF SUMMARY OF THE INVENTION

The present invention relates generally to the field of mobile ordering, and in particular to a messaging system configured to facilitate mobile ordering between a user device and a merchant system. Mobile ordering is often used in food service applications. However, other fields utilizing the ability to order a product or service quickly from a user's mobile device may incorporate aspects of the messaging system. The present invention provides systems and methods to initiate, facilitate, process and/or perform mobile orders. While useful in any endeavor utilizing mobile ordering, the mobile systems described herein are particularly useful in the food service industry where users often order food using a mobile device, such as a mobile phone.

In one aspect, a messaging system for mobile ordering is provided. The messaging system may include a communications module configured to facilitate communication between a merchant and a user. The communications module may include a web interface and a messaging interface. The messaging system may also include a memory and a processor. The processor may be configured to associate a merchant identifier with the merchant. The merchant identifier may include a merchant handle of a messaging system that serves as a message delivery address for the merchant within the messaging system. The processor may also be configured to create a user account for the user, the user account being associated with an ordering system of the merchant. The user account may include a user identifier including a user handle of the messaging system that serves as a message delivery address for the user within the messaging system. The processor may further be configured to receive, using the web interface, a product order comprising order details selected from one or more of a product, an order processing preference, a price, or a payment type. The processor may be configured to store the product order on the memory and to associate the stored product order with an order code such that the order details are retrievable based on reception of the order code. The processor may also be configured to provide, using the messaging interface, an enrollment message to the user. The enrollment message may be directed to the user by the user handle. The processor may be further configured to receive, using the messaging interface, a message from the user handle directed to the merchant handle. The message may include the order code. The processor may be configured to associate the user handle with the merchant handle and the order code to identify the product order, the merchant, and the user. The processor may also be configured to provide to the user handle, using the messaging interface, an order confirmation message comprising at least some of the order details. The processor may be further configured to receive, using the messaging interface, a user confirmation message from the user handle and to communicate, using the communications module, the product order to the merchant. The processor may be configured to provide to the user handle, using the messaging interface, an order status message.

In another aspect, a method for facilitating mobile ordering is provided. The method may include associating a merchant identifier with a merchant using a messaging system that may have a computing device having a processor and communications module that are configured to facilitate communication between a user and the merchant. The merchant identifier may include a merchant handle of a messaging system that serves as a message delivery address for the merchant within the messaging system. The method may also include creating, using the messaging system, a user account for a user, the user account being associated with an ordering system of the merchant. The user account may include a user identifier including a user handle of the messaging system that serves as a message delivery address for the user within the messaging system. The method may further include receiving, using a web interface of the communications module, a product order that may have order details selected from one or more of a product, an order processing preference, a price, or a payment type. The method may include storing the product order on a memory of the messaging system and associating the stored product order with an order code such that the order details are retrievable based on reception of the order code. The method may also include providing, using a messaging interface of the communications module, an enrollment message to the user. The enrollment message may be directed to the user by the user handle. The method may further include receiving, using the messaging interface, a message from the user handle directed to the merchant handle. The message may include the order code. The method may also include associating the user handle with the merchant handle and the order code to identify the product order, the merchant, and the user and providing to the user handle, using the messaging interface, an order confirmation message comprising at least some of the order details. The method may further include receiving, using the messaging interface, a user confirmation message from the user handle. The method may include communicating the product order to the merchant and providing to the user handle, using the messaging interface, an order status message.

Other objects, features and advantages of the present invention will become more fully apparent from the following detailed description, the appended claims, and the accompanying drawings.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

For the purposes of explanation, the ensuing description provides specific details that are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

The current invention relates generally to mobile ordering systems, although embodiments are not so limited. Specifically, embodiments of the invention are directed toward a messaging system that facilitates mobile ordering between a user device and a merchant system. The customer's favorite orders, payment information, order fulfillment preferences, and/or other order details may be stored for quick access for future orders. The messaging system may operate and maintain a website and/or a mobile application for one or more merchants. The messaging system may provide an interface between users and merchants, allowing smaller merchants and businesses to provide mobile ordering options without the need to purchase expensive infrastructure. This also reduces the barrier to entry for mobile ordering as less sophisticated merchants may take advantages of the services and integration provided by the messaging system.

In some embodiments, the messaging system may be configured to communicate with one or more communication or messaging protocols, thus allowing the messaging system to communicate with any user device to complete the ordering process. For example, the messaging system may communicate publicly access communications protocols, such as short message service (SMS) protocol, instant messaging protocols, such as IRC™, AOL™, Google™, etc., social network messaging protocols, such as Twitter™ and Facebook™ messenger, and/or other public communications protocols. The messaging system may detect the communications protocol used by a user device and format incoming and outgoing messages appropriately. In some embodiments, a merchant may use a different communications protocol from the user device and/or merchant system. The messaging system may detect both the communications protocol of the user device and the merchant system and translate incoming messaging from the user device to match the communication protocol of the merchant system.

Figure 1:
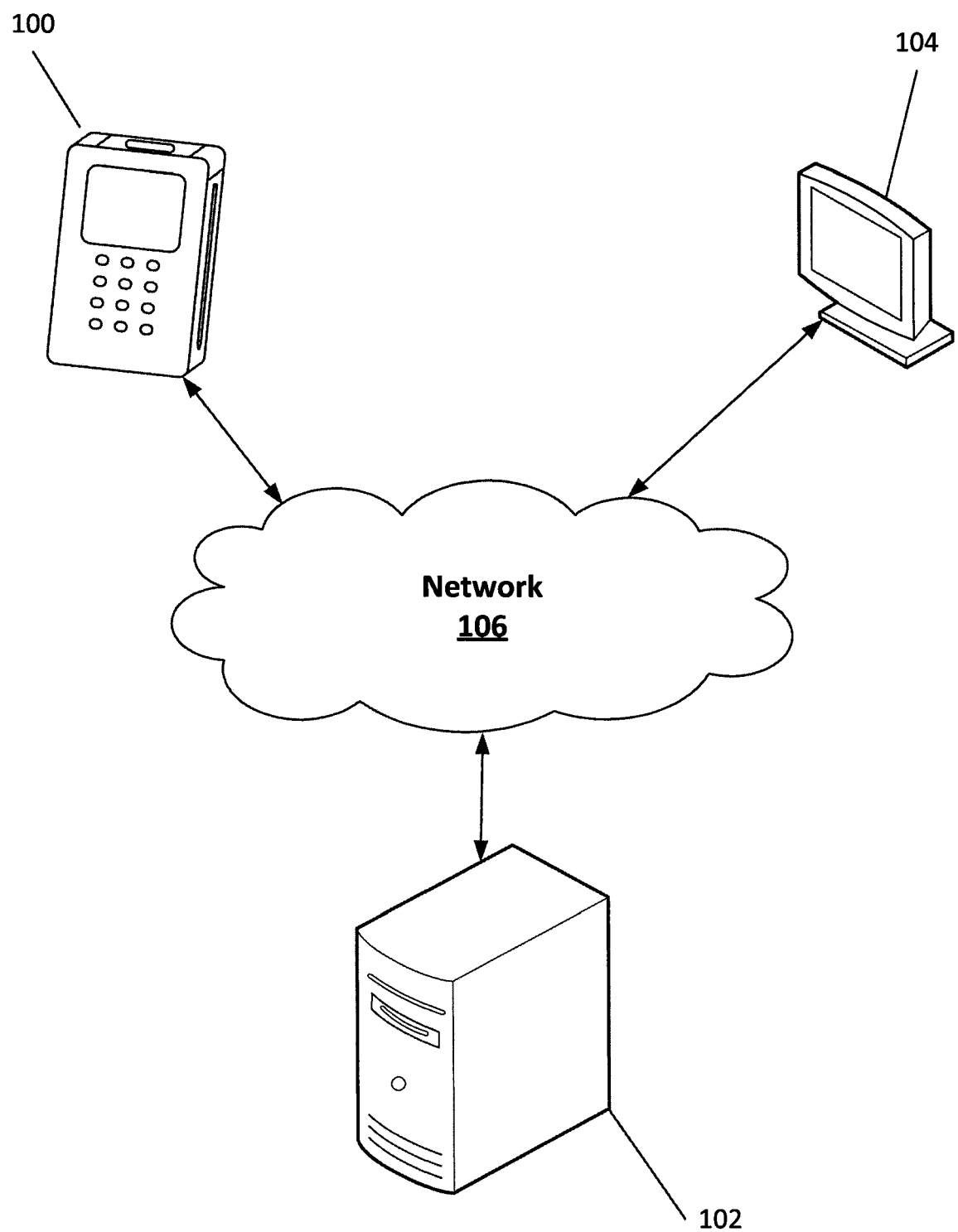
FIG. 1 illustrates a simplified diagram of a portion of a mobile ordering system infrastructure.

Turning now to FIG. 1, a system diagram for a mobile ordering system is shown. The system may include a user device 100 that may be used to interact with other components of the system via a network 106. User device 100 may include, for example, a mobile communications device such as a mobile phone or tablet computer, a laptop or personal computer, or any other computing device. User device 100 includes a display, a network interface, and at least one input device to receive user inputs, such as a keyboard, touch screen, mouse, stylus, and the like. Network 106 may be a local area network (LAN) and/or other private or public wired and/or wireless networks. Network 106 may be communicatively coupled with one or more of the components of the system to facilitate communication between the various components. It will be appreciated that one or more different network connections may be used in accordance with the invention, and that the use of a single network 106 to enable communications is merely one example of such configurations. For example, each component may be communicatively coupled with other components using a separate network for one or more of the connections.

User device 100 is able to communicate with a messaging system 102 or other communications system in order to complete a mobile ordering process. Such communications may include information used to create a user account, product orders, order changes, and the like. In some embodiments, the messaging system 102 may be a server or other computing device. For example, the messaging system 102 may facilitate the creation user account, and may include a computing device having a processor configured to control functions of the messaging system 102. The processor may also be configured to run computer logic that can identify a communications protocol used by the user device 100 such that incoming and outgoing messages may be properly formatted. The messaging system 102 may also include a communications module configured to enable communications with the user device 100 and a merchant system 104, such as over one or more networks 106.

The communications module may include a web interface configured to communicate with a user device 100 using a website and/or mobile application. Such an interface may be utilized to communicate information related to the creation of user accounts and/or to place an initial order. The communications module may also include a messaging interface configured to communicate with a user device 100 and a merchant system 140 using a communications protocol for use in mobile ordering processes. Typically, the messaging system will utilize an existing, public communications protocol, such as Twitter™, SMS, and the like. However, in some embodiments, the messaging system 102 may include its own proprietary communications protocol with which the messaging system 102 communicates with the user device 100 and the merchant device 104. Additionally, the messaging system 102 may communicate product or service orders to a merchant system 104 for fulfillment of the order. In some embodiments, the messaging system logic may be configured to translate messages from the user device's communications protocol to a communications protocol of the merchant system 104 or messages from the communications protocol of the merchant system 104 to the user device's communications protocol. The messaging system 102 may also include a memory for storing user accounts, product orders and details, order codes for favorite and/or frequent orders of a user, and other information.

The user device 100 and the merchant system 104 may each have a handle or other identifier with which the messaging system 102 may use to direct communications. For example, a user device 100 and/or merchant system 104 may communicate with the messaging system 102 using SMS. The user handle may be the user's mobile phone number. The merchant handle may be a phone number associated with the merchant by the messaging system 102 such that when the messaging system 102 receives a message directed to the merchant handle, the messaging system 102 may properly identify an appropriate merchant for the order. In other embodiments, the user and/or merchant handles may be social media messaging system handles, such as a Twitter™ handle associated with the user or merchant. It will be appreciated that any combination of existing and/or proprietary user and/or merchant handles may be utilized.

The messaging system 102 may use the user and merchant handles to identify a source of any incoming messages, to direct outgoing messages, and/or to determine a product or service a user wishes to order. For example, an order code may be stored on the messaging system 102 that is associated with a particular order stored on the messaging system 102. The messaging system 102 may identify a user handle for the source of a message that includes an order code, a merchant handle that the message was directed to, and the order code itself. Upon these identifications, the messaging system 102 may determine a user, a merchant, and an order. This information may be used to prepare and transmit a message to the merchant system 104 that includes order details associated with the order, such as a product and/or service to be ordered, whether a product is to be picked up or delivered, a payment type, a requested time of completion of an order, and or other details related to an order. The merchant system 104 and/or merchant may then fulfill the order for the user.

In some embodiments, the messaging system 102 may assign and/or associate the user and/or merchant handles with the user and/or merchant, respectively. In embodiments where an existing or third party communications protocol, such as SMS, is used, the messaging system 102 may store a record of a user's handle. For example, when supplying account registration information, a user may provide a user handle, such as a phone number, Twitter™ handle, or other messaging handle. The messaging system 102 may use this handle to communicate with the user. In embodiments where a proprietary messaging protocol is used, the messaging system 102 may generate and assign a user handle of the user device 100. The merchant handle may be selected by the merchant and/or may be generated and assigned by the messaging system 102.

In some embodiments, the messaging system 102 may operate and maintain a website and/or mobile application associated with the merchant. In other embodiments, the merchant may have its own website and/or mobile application from which data may be communicated to the messaging system 102 for integration within the mobile ordering system. In some embodiments, the mobile application and/or website may be specific to the merchant, such that a user account is needed for each merchant the user wishes to order from. The mobile application and/or website may include pages for a number of merchants. In such cases, a user may only need one user account for the entire website and/or mobile application. By logging into the single account and navigating to a particular merchant page, the user may place an order, with any information from the single user account (other than order codes that are associated with orders from particular merchants) being available for automatic entry into an ordering platform for each merchant. This saves the user considerable time, as contact and payment details need only be entered once, rather than each time a user orders from a new merchant. The website and/or mobile application may receive registration and/or initial order information that may be used to create the user account. Upon creation of the user account and saving an order along with an associated order code, the user may use the same and/or a different communications protocol, such as SMS, to communicate an order to the message system.

The merchant system 104 may include a point of sale (POS) system of the merchant and/or be in communication with a POS system of the merchant. For example, the merchant system 104 may provide screen images and/or print outs of orders received from the messaging system 102. The merchant may then fulfill the order, such as by preparing products or food for delivery or pickup, or by completing an ordered service. The merchant system 102 may also be configured to send messages, such as status updates and/or other messages to the messaging system 102. As one example, if a merchant cannot fulfill an order, the merchant system 104 may communicate a message indicating that the order will be delayed or cancelled. Such a message may also include an explanation for the order change. These messages may be passed along to the user device 100 by the messaging system 102. In some embodiments, a merchant may provide a coupon or other discount for a future transaction to the messaging system 102 for transmission to the user device 100. This may be done as part of a loyalty program or similar promotion to reward customers and/or discounts to make up for any inconvenience caused by a delayed, cancelled, and/or otherwise altered order.

Figure 2:
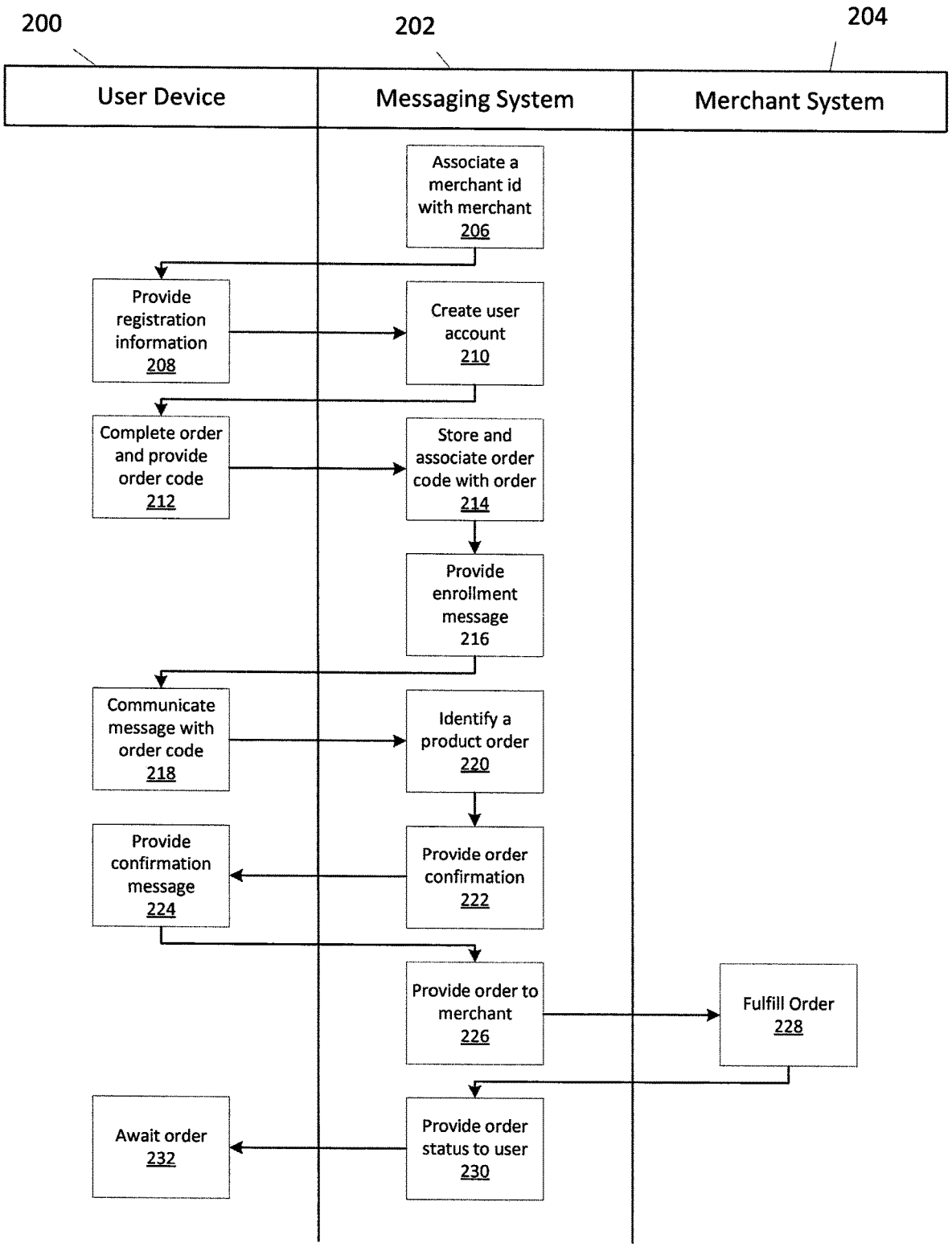
FIG. 2 illustrates a swim lane diagram of system for mobile ordering according to embodiments.

FIG. 2 depicts a swim lane diagram of a mobile ordering process according to one embodiment. The ordering process may involve a user device, a messaging system, and/or a merchant system as described in the mobile ordering system described above. A messaging system 202 may associate a merchant handle or other identifier with a merchant at 206. In some embodiments, the merchant handle may be generated by the messaging system 202. The merchant handle may be a phone number, an instant messaging handle, and/or any other identifier that may be used to identify the merchant and direct communications to a merchant system 204. A user device 200 may provide registration information to the messaging system at 208. This may be done by a user entering information into user device 200, such as by filling out a form on a website and/or mobile application associated with the merchant. The website and/or mobile application may be operated by the merchant or merchant system 204 or may be operated by the messaging system 202. Registration information may include identification data, such as a user's name and address, as well as payment information, and/or other information that may be used in the creation of a user account. The messaging system 202 may create the user account at 210. In some embodiments, the user account may be associated with a particular merchant. In other embodiments, such as those where a single website serves multiple merchants, the user account may be stored for use with any of the merchants.

Upon creation of a user account, the user device may provide an order for a product and/or service, along with an order code at 212. The order may include details identifying a product and/or service the user wishes to order, configuration selections for the product or service, such as item size or flavor, payment and/or i-payment details, whether a product is to be delivered or picked up, a requested fulfillment time of the order, delivery information, a name of a person for whom the order is to be fulfilled, contact information for the person, any special instructions for delivery or order fulfillment such as an entry gate code and/or special requests. Special requests may include a request for condiments or a special order and/or other order details. Payment details may include a preferred payment type, a payment media identifier, a payment media expiration date, a payment media security code, a cash option, and/or other information related to the payment of the order.

Along with and/or separate to the order, the user device 200 may provide an order code to be associated with the order and corresponding order details. For example, upon selecting a meal and specifying any order details, a user may be prompted to save the meal and order details or other preferences as a favorite meal. The user may select an order code, such as an alphanumeric identifier to use in future orders for the particular meal. As one example, a user may order a ham sandwich on rye. The user may enter "hamonrye" as an order code to be associated with the order. In some embodiments, the order code may be generated by the user and/or user device 200 and provided via a network connection to messaging system 202. In other embodiments, the messaging system 202 may provide an order code or a list of order codes for the user to choose from. Once an order code is provided, the messaging system 202 may store and associate the order, order details, and order code with one another at 214. When storing this information, the messaging system may also associate the order code with the merchant handle and a user handle. The user handle may be provided by the user device 200, such as during the registration process and/or during the initial ordering process. For example, for SMS based ordering, the user may enter a mobile phone number that the messaging system 202 uses as the user handle. If a different communications protocol, such as an instant messaging protocol and/or a social network messaging protocol, is used, the user may be prompted to enter a user name or other handle associated with the communications protocol.

Upon creation of the user account, the messaging system 202 may provide an enrollment message to the user device 200 at 216. The enrollment message may be routed based on the user handle. The enrollment message may include a confirmation of the creation of the account, as well as the merchant handle. The merchant handle may be provided within the enrollment message and/or may be a source of the enrollment message. For example, an SMS message may be sent to the user's mobile device from the phone number serving as a merchant handle. The user may then send an SMS message and/or reply to the enrollment message to place future orders. Future orders may be placed by the user communicating a message that includes the order code from the user device 200 to the messaging system 202 using the merchant handle at 218. In some embodiments, the user device 200 may be the same device used to provide registration information and place the initial order. In other embodiments, a different user device 200 may be used to communicate the message. As one example, a user may use his personal computer to access a merchant website to register and place the initial order. The user may then use his mobile phone to send an SMS message to the messaging system that contains the order code. For example, the user may send an SMS message including "hamonrye" to the messaging system 202. The messaging system 202 receives the message containing the order code. The messaging system 202 detects the user handle from which the message was sent, as well as the merchant handle to which the message was directed. The messaging system 202 then associates the merchant handle, user handle, and order code and looks up a stored order, order details, user, and/or merchant matching this information.

The messaging system 202 provides an order confirmation to the user device 200 at 222. The order confirmation may include one or more of the order details, such as a payment type, whether the order is to be delivered, the order code, and/or any other order details. In some embodiments, the order confirmation may request an action to be performed on the user device 200. For example, the user may be asked to respond, using the user device 200, whether the confirmation message is correct, or whether any changes are needed. The user may reply using the user device 200 to confirm the order at 244. The messaging system 202 may then communicate with the merchant, such as by sending the identified order and order details to the merchant system 204, along with delivery and/or pickup instructions at 226. The details may be provided to a POS system, a backend computer, a mobile device such as a table, a fax machine, and/or a printer of the merchant such that the merchant may review and fulfill the order at 228. In some embodiments, the merchant may provide a confirmation and/or other order update to the messaging system 202. For example, the merchant may be out of a certain product and/or be backed up such that the order needs to be delayed or cancelled. The merchant may send a message from the merchant system 204 to the messaging system 202 indicating such changes to the order. In some embodiments, the merchant may also be able to provide a discount, coupon, or other offer to be transmitted to the user device 200 to make up for any inconvenience caused by a change or cancellation to the order, and/or to reward the user for ordering from the merchant. The messaging system 202 may also provide a discount or promotion to reward the user for using the messaging system 202 to complete the mobile order. The messaging system 202 may provide an order status to the user device 200 at 230. The order status may alert the user that the order is being fulfilled, changed, cancelled, and/or may include any promotions or discounts. The user may then await fulfillment of the order at 232. The process may also include processing a payment from the user's payment account to the merchant. For example, an authorization request including payment details associated with the user account may be transmitted by the messaging system 202 to a financial institution for authorization of a payment for the ordered good and/or service. Financial institutions may include, for example, an issuer of a payment media or payment type. An authorization approval may be received from the financial institution, which may be communicated to the merchant. If an authorization request is denied, upon notification, the messaging system 202 may communicate a message to the user device 200 that the payment was denied. The user device 200 may be prompted to provide an alternate payment type to continue the order. In some embodiments, a default backup payment type may be selected such that an authorization request may be sent automatically upon denial of the initial authorization request.

Figure 3:
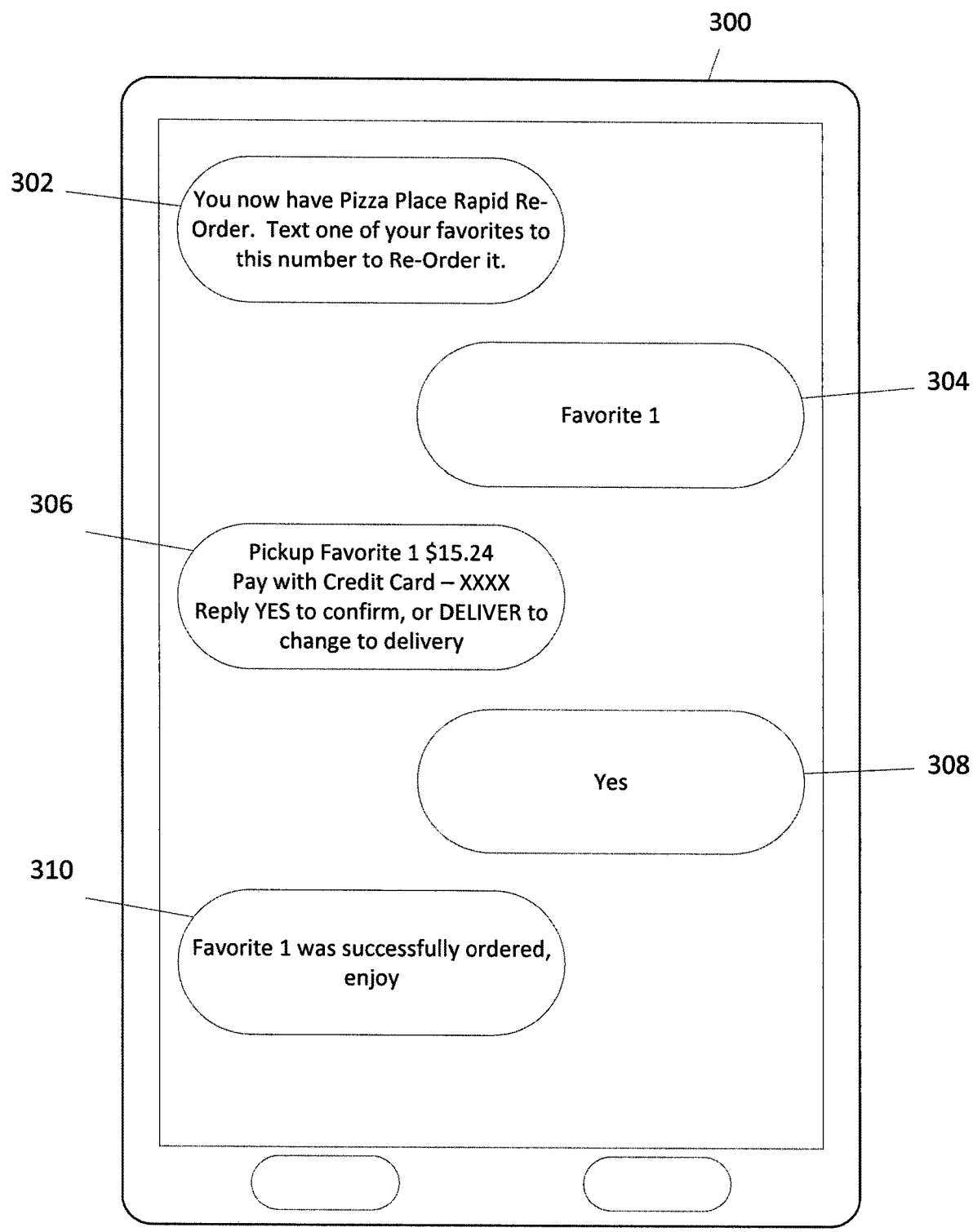
FIG. 3 illustrates user device interactions according to embodiments.

FIG. 3 depicts the operation of a user device 300 during a mobile ordering operation according to one embodiment. User device 300 may be a user device similar to user devices 100 and 200 as described herein. For example, user device 300 may be a mobile phone, a tablet computer, a personal computer, and/or any computing device. The user may enroll in the mobile ordering system and/or a messaging system as described above in FIG. 2. Upon enrollment, the user device 300 may receive an enrollment message 302. The enrollment message 302 may include a message confirming that the enrollment is complete and/or directions on how to place mobile orders. As one example, if the user device 300 and/or a messaging system utilize SMS for communication, the enrollment message 302 may instruct the user to text an order code and/or favorite to a phone number that is acting as a merchant handle. This number, or merchant handle, may be provided within the enrollment message 302 and/or may be a source of the enrollment message 302. For example, the enrollment message 302 may be sent using SMS from the merchant handle. The user may then save the merchant handle as a contact on the user device 300 such that any time the user wants to place a mobile order the user just sends an SMS message to the merchant handle. Similar methods of providing a merchant handle may be completed using other communications protocols such as instant messaging protocols and/or social network messaging protocols.

To place an order, the user may enter and send an order code 304 to the merchant handle. The order code 304 may be any order code the user and/or the messaging system have defined to represent an order and order details. As one example, the user may enter "hamonrye" as described above to order a ham sandwich on rye from a particular merchant. As shown in FIG. 3, the user enters "Favorite 1" to order a meal associated with the order code "Favorite 1." Upon receipt, the messaging system may use the merchant handle to which the order code was sent, the user handle from which the order code was sent, and the order code itself to look up an associated user, merchant, order, and order details. The messaging system may then send the user device 300 a confirmation message 306. The confirmation message 306 may confirm to the user that the order has been placed and/or may ask for a confirmation from the user that the correct order and/or order details have been identified. For example, the confirmation message 306 may note the order code and/or order to be placed. Here, the confirmation message 306 confirms that the user wishes to order "Favorite 1" and includes a price of the order associated with the order code. In some embodiments, the confirmation message 306 may include a description the actual product and/or service to be ordered rather than, or in addition to, the order code. The confirmation message may also include a confirmation of payment type, such as a description of a default payment type and/or payment media, such as credit card XXXX, where XXXX represent an identifier of a payment media such as the last four digits of a credit card. The confirmation message 306 may provide instructions on how to confirm and/or change an order. For example, the confirmation message 306 may request a reply of "YES" to confirm the order and order details are correct. The confirmation message 306 may allow for a change of manner of order fulfillment. For example, if the saved order and order code were for a pickup delivery, the user may be requested to reply with "DELIVERY" in order to change the order to a delivery fulfillment. Other instructions may be provided, such as to allow a user to specify special instructions and/or to make changes to one or more of the order details. For example, a user may want the previous order without pickles, and may respond with a message such as "SUB— NO PICKLES" to request the change. The user may enter a user confirmation message 308, such as "Yes" or "Delivery" to confirm that the messaging system has properly identified the order.

Upon confirmation, the messaging system may communicate the order and order details to the identified merchant and may send an order status message 310 to the user device 300. The order status message 310 may inform the user that the order was successfully placed. In other embodiments, the order status message 310 may alert the user of any changes and/or cancellations by the merchant. The order status message 310 may also include a coupon, discount, and/or other promotion as described above. The promotion may be in the form of an offer code that the user may supply when making a future order and/or a hyperlink may be included with an electronic coupon may be provided in the order status message 310. In some embodiments, a promotion may be sent as a separate message and/or may be provided in a separate form, such as in an email to an account specified by the user.

Figure 4:
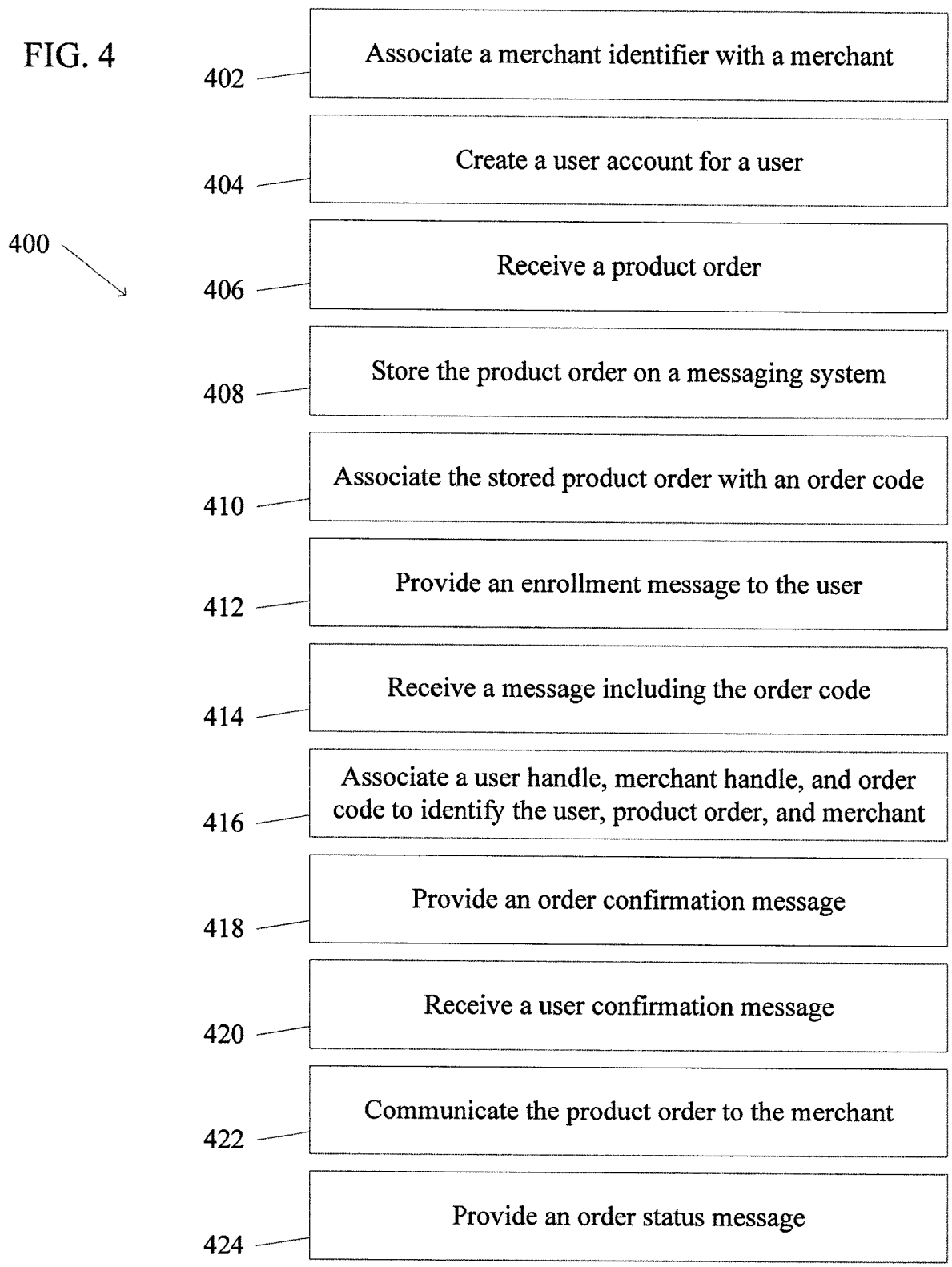
FIG. 4 is a flowchart depicting a process for facilitating mobile ordering according to embodiments.

FIG. 4 is a flowchart depicting a process 400 for facilitating mobile ordering. The process 400 may be performed by a messaging system, such as messaging systems 102 and 202 described herein. Steps of process 400 may be similar to those in the swim lane diagram of FIG. 2, and messages may correspond to those shown on device 300 of FIG. 3. The process 400 may begin with associating a merchant identifier with a merchant using a messaging system at block 402. The messaging system may have a computing device having a processor and a communications module that are configured to facilitate communication between a user and the merchant. The merchant identifier may include a merchant handle of a messaging system that serves as a message delivery address for the merchant within the messaging system.

In some embodiments, the merchant handle may be generated by the messaging system. A user account may be created, using the messaging system, at block 404. The user account may be associated with an ordering system of the merchant, such as a POS system of the merchant. The user account may include a user identifier that includes a user handle of the messaging system that serves as a message delivery address for the user within the messaging system. In some embodiments, the process 400 may include detecting a messaging protocol associated with the user handle and determining a message format for outgoing messages from the messaging system to the user handle based on the detected messaging protocol. The messaging system may format the outgoing messages to conform to the determined message format such that the messages are rendered properly on an interface for the user handle on the user device. The messaging system may also translate incoming messages from the user handle into a messaging system format based on the detected messaging protocol. For example, the messaging system may recognize the user handle is a phone number and the messaging or communications protocol is SMS protocol. The messaging system may then translate content of the SMS message to a messaging protocol used by the messaging system such that the translated content may be analyzed. The messaging system may parse information from the translated incoming messages to identify contents of the incoming messages for use by the messaging system, such as for determining a proper order, user, and merchant.

A product order may be received, using a web interface of the communications module, at block 406. The product order may include order details including one or more products, an order processing preference, a price, a payment type and/or any other information relevant to the fulfillment of an order. At block 408, the product order and/or order details may be stored on a memory of the messaging system. At block 410, the stored product order may be associated with an order code such that the order details are retrievable based on reception of the order code. The order code may be selected and/or provided by the user, or the messaging system may assign the order code. An enrollment message may be provided to the user by a messaging interface of the communications module at block 412. The messaging interface may be configured to facilitate communication using multiple communications interfaces. For example, the messaging interface may be configured to send and receive messages via SMS, instant messaging services, social media messaging services, and/or other messaging protocols. The messaging system may detect a the protocol, determine proper formatting based on the detected protocol, and/or translate messages from one format to another format based on protocol used by the user device, messaging system, and/or merchant system. The enrollment message may be directed to the user by the user handle.

A message from the user handle and directed to the merchant handle is received using the messaging interface at block 414. The message may include the order code. The messaging system associates the user handle with the merchant handle and the order code to identify the product order, the merchant, and the user at block 416. At block 418, an order confirmation message is provided to the user handle using the messaging interface. The order confirmation message may include at least some of the order details. In the event that the order code or user is not recognized, the system may also send back an error message. For example, if the system recognizes the user but not the order code, the system may include valid order codes in a response to the user and/or user device. As one example, a response may include a message such as "unrecognized favorite, select from "hamonrye," "lunch," or "pizza." In some embodiments, the order confirmation message may include instructions on how to confirm the order, cancel the order, change a payment type, change a fulfillment method, and/or change order details. A user confirmation message is received from the user handle using the messaging interface at block 420. The user confirmation message may include an order confirmation, a request to cancel or modify the order, a change in payment type, and/or change in a fulfillment method (i.e. delivery or pickup). For delivery orders, a user may also enter a tip or gratuity, although this may be an order detail provided in the initial order. The product order is communicated to the merchant at block 422 for fulfillment. This may be done by providing the product order to the merchant's POS system, backend computer, and/or printer. An order status message is provided to the user handle using the messaging interface at block 424. As described above, the order status message may include a status of the order, a coupon or other promotion, and/or other information related to the fulfillment of the order.

Figure 5:
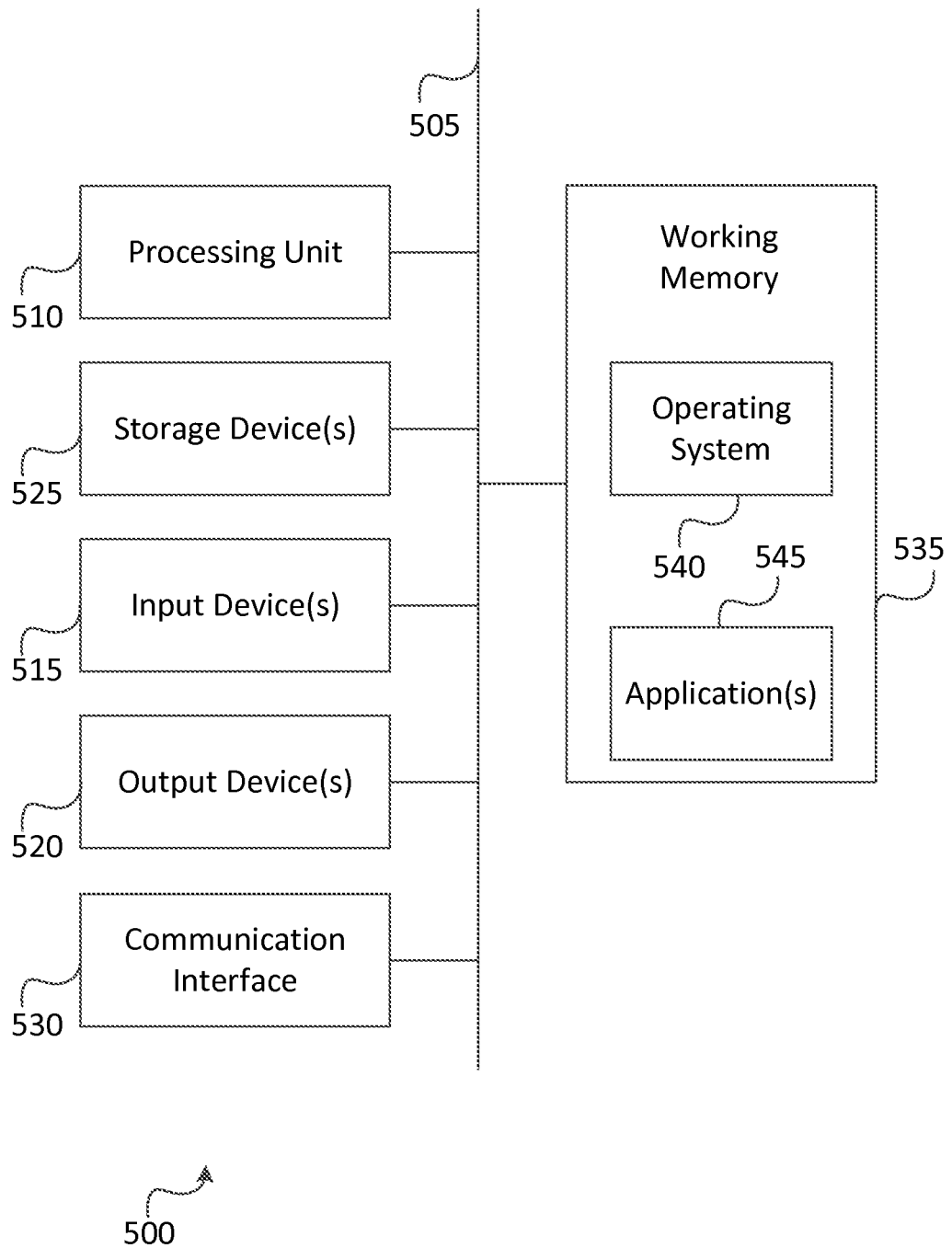
FIG. 5 is a block diagram of an example computing system according to embodiments.

A computer system as illustrated in FIG. 5 may be incorporated as part of the previously described computerized devices. For example, computer system 500 can represent some of the components of the user devices 100, 200, and 300, messaging systems 102 and 202, and/or merchant systems 104 and 204 as described herein. FIG. 5 provides a schematic illustration of one embodiment of a computer system 500 that can perform the methods provided by various other embodiments, as described herein, and/or can function as the host computer system, a remote kiosk/terminal, a ticket vending machine or other point-of-sale device, a mobile device, and/or a computer system. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more general-purpose processors and/or one or more special-purpose processors (such as digital signal processing chips, graphics acceleration processors, and/or the like); one or more input devices 515, which can include without limitation a mouse, a keyboard, a touchscreen, receiver, a camera, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

The invention has now been described in detail for the purposes of clarity and understanding. However, those skilled in the art will appreciate that certain changes and modifications may be practiced within the scope of the appended claims.

The preceding description provides exemplary embodiment(s) only, and is not intended to limit the scope, applicability or configuration of the disclosure. Rather, the description of the exemplary embodiment(s) provide those skilled in the art with an enabling description for implementing an exemplary embodiment of the disclosure. It is to be understood that various changes may be made in the function and arrangement of elements without departing from the spirit and scope of the disclosure as set forth in the appended claims.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the principles of the disclosure have been described above in connection with specific apparatuses and methods, it is to be clearly understood that this description is made only by way of example and not as limitation on the scope of the disclosure.

What is claimed is:

1. A messaging system for mobile ordering, the messaging system comprising:
   a communications module configured to facilitate communication between a plurality of merchants and a user, the communications module comprising a web interface and a messaging interface;
   a memory; and
   a processor configured to:
      associate a merchant identifier with a particular merchant of the plurality of merchants, wherein the merchant identifier comprises a merchant handle of the messaging system that serves as a message delivery address for the particular merchant within the messaging system;
      create a user account for the user, the user account being associated with an ordering system of each of the plurality of merchants, wherein the user account comprises a user identifier including a user handle of the messaging system that serves as a message delivery address for the user within the messaging system;
      receive, using the web interface, a product order comprising order details for the particular merchant selected from one or more of a product, an order processing preference, a price, or a payment type;

detect a first messaging protocol associated with the user handle;

determine a first message format for outgoing message from the messaging system to the user handle based on the detected first messaging protocol;

format each outgoing message from the messaging system to the user handle to conform to the determined first message format;

detect a second messaging protocol associated with the merchant handle;

determine a second message format for outgoing message from the messaging system to the merchant handle based on the detected second messaging protocol;

format each outgoing message from the messaging system to the merchant handle to conform to the determined second message format;

store the product order on the memory;

receive a message from a user device that includes instructions to use a particular string of characters as an order code that is associated with the order details for the particular merchant;

associate the stored product order with the order code such that the order details are retrievable based on reception of the order code;

provide, using the messaging interface, an enrollment message to the user, the enrollment message comprising a confirmation of the creation of the user account and the merchant handle, wherein the enrollment message is directed to the user by the user handle;

receive, using the messaging interface, a message from the user handle directed to the merchant handle, the message comprising the order code and a requested fulfillment time of the product order associated with the order code;

associate the user handle with the merchant handle and the order code to identify the product order, the particular merchant, and the user;

provide to the user handle, using the messaging interface, an order confirmation message comprising at least some of the order details;

receive, using the messaging interface, a user confirmation message from the user handle;

communicate, using the communications module, the product order and the requested fulfillment time to the particular merchant;

receive, using the messaging interface, a modification to the product order from the particular merchant;

provide to the user handle, using the messaging interface, an order status message, the order status message comprising the modification to the product order; and receive a response to the order status message from the user handle.

2. The messaging system of claim 1, wherein the processor is further configured to:

translate incoming messages from the user handle into a messaging system format based on the detected messaging protocol; and parse information from the translated incoming messages to identify contents of the incoming messages for use by the messaging system.

3. The messaging system of claim 1, wherein:

the messaging interface is configured to facilitate communication using multiple communications protocols.

4. The messaging system of claim 3, wherein:

the multiple communication protocols comprise one or more of short message service (SMS), an instant message service protocol, or a social network message service protocol.

5. The messaging system of claim 1, wherein:

receiving a user confirmation message from the user handle comprises receiving instructions to change one or more of the order details.

6. The messaging system of claim 1, wherein:

the web interface is configured for communication with one or both of a merchant website or a mobile application of the merchant.

7. The messaging system of claim 1, wherein:

communicating the product order to the particular merchant comprises providing the product order to a point of sale device of the particular merchant.

8. The messaging system of claim 1, wherein:

receiving the product order comprises receiving the order code.

9. The messaging system of claim 1, wherein the processor is further configured to:

communicate an authorization request to a financial institution, the authorization request comprising payment details associated with the payment type;

receiving an authorization approval from the financial institution; and communicating the authorization approval to the particular merchant.

* * * * *